United States Patent
Whitten et al.

(10) Patent No.: US 8,639,721 B2
(45) Date of Patent: *Jan. 28, 2014

(54) VARIABLY CONTROLLING ACCESS TO CONTENT

(75) Inventors: Alma W. Whitten, Walnut Creek, CA (US); Joseph K. O'Sullivan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,368

(22) Filed: Sep. 13, 2012

(65) Prior Publication Data

US 2013/0125248 A1 May 16, 2013

Related U.S. Application Data

(63) Continuation of application No. 12/501,735, filed on Jul. 13, 2009, now Pat. No. 8,543,599, which is a continuation of application No. 10/956,564, filed on Oct. 1, 2004, now Pat. No. 7,603,355.

(51) Int. Cl.
  *G06F 7/00* (2006.01)
  *G06F 17/30* (2006.01)
  *G06F 21/62* (2013.01)

(52) U.S. Cl.
  CPC ............ *G06F 21/62* (2013.01); *G06F 21/6209* (2013.01); *G06F 2221/2141* (2013.01)
  USPC ............ 707/781; 707/694; 707/782; 707/783

(58) Field of Classification Search
  CPC ................ G06F 21/62; G06F 21/6209; G06F 2221/2141
  USPC .......................... 707/694, 705, 781, 782, 783
  See application file for complete search history.

(56) References Cited

U.S. PATENT DOCUMENTS

| 5,181,162 A | 1/1993 | Smith et al. |
| 5,572,643 A | 11/1996 | Judson |

(Continued)

FOREIGN PATENT DOCUMENTS

| EP | 1225500 A2 | 7/2002 |
| JP | 06-059854 A | 3/1994 |

(Continued)

OTHER PUBLICATIONS amazon.com, Inc., "Press Release: Amazon.Com Launches "Search Inside the Book" Enabling Customers to Discover-Books by Searching and Previewing the Text Inside", Oct. 23, 2003, 3 pages [online] [Retrieved on Jan. 4, 2005] Retrieved from the Internet <URL: http://phx.corporate-ir.netlphoenix.zhtml?c=97664&p=IROLNewsText&t=ReQular&id=462057&>.

(Continued)

*Primary Examiner* — Phong Nguyen
(74) *Attorney, Agent, or Firm* — Fenwick & West LLP

(57) ABSTRACT

A software module is presented that enables a person to determine the relevance of a document while preventing the person from making a copy of the entire document. In one embodiment, this is accomplished by programmatically controlling which portions of a document will be presented to a user and which portions will not be presented to the user. In one embodiment, the software module is used in conjunction with a search engine to present a document search result.

20 Claims, 4 Drawing Sheets

(56) References Cited

U.S. PATENT DOCUMENTS

| | | | |
|---|---|---|---|
| 5,893,101 A * | 4/1999 | Balogh et al. | 707/999.104 |
| 5,960,448 A * | 9/1999 | Reichek et al. | 715/236 |
| 6,012,087 A | 1/2000 | Freivald et al. | |
| 6,085,193 A | 7/2000 | Malkin et al. | |
| 6,141,754 A | 10/2000 | Choy | |
| 6,236,991 B1 | 5/2001 | Frauenhofer et al. | |
| 6,308,273 B1 | 10/2001 | Goertzel et al. | |
| 6,314,425 B1 | 11/2001 | Serbinis et al. | |
| 6,321,256 B1 | 11/2001 | Himmel et al. | |
| 6,473,752 B1 | 10/2002 | Fleming, III | |
| 6,636,242 B2 | 10/2003 | Bowman-Amuah | |
| 6,647,388 B2 | 11/2003 | Numao et al. | |
| 6,654,754 B1 | 11/2003 | Knauft et al. | |
| 6,799,302 B1 | 9/2004 | Sites | |
| 6,978,445 B2 | 12/2005 | Laane | |
| 7,082,573 B2 | 7/2006 | Apparao et al. | |
| 7,133,834 B1 | 11/2006 | Abelow | |
| 7,219,309 B2 * | 5/2007 | Kaasila et al. | 715/800 |
| 7,290,285 B2 | 10/2007 | McCurdy et al. | |
| 7,316,032 B2 | 1/2008 | Tayebi et al. | |
| 7,421,411 B2 | 9/2008 | Kontio et al. | |
| 7,475,242 B2 | 1/2009 | Baird et al. | |
| 7,515,717 B2 | 4/2009 | Doyle et al. | |
| 7,561,755 B2 * | 7/2009 | O'Sullivan | 382/284 |
| 7,603,355 B2 * | 10/2009 | Whitten et al. | 707/999.103 |
| 7,660,902 B2 | 2/2010 | Graham et al. | |
| 7,664,751 B2 | 2/2010 | O'Sullivan | |
| 7,739,299 B2 | 6/2010 | Kii et al. | |
| 8,112,715 B2 | 2/2012 | Cragun et al. | |
| 2003/0105668 A1 * | 6/2003 | Segawa et al. | 705/14 |
| 2003/0163724 A1 * | 8/2003 | Tayebi et al. | 713/200 |
| 2003/0196169 A1 | 10/2003 | Wittkotter et al. | |
| 2004/0078422 A1 | 4/2004 | Toomey | |
| 2004/0177044 A1 | 9/2004 | Peterka | |
| 2004/0267815 A1 | 12/2004 | De Mes | |
| 2005/0022019 A1 | 1/2005 | Medvinsky et al. | |
| 2005/0060549 A1 | 3/2005 | England et al. | |
| 2005/0076030 A1 * | 4/2005 | Hada et al. | 707/9 |
| 2005/0108176 A1 | 5/2005 | Jarol et al. | |
| 2005/0246762 A1 * | 11/2005 | Girouard et al. | 726/2 |
| 2005/0262568 A1 | 11/2005 | Hansen et al. | |
| 2006/0085469 A1 | 4/2006 | Pfeiffer et al. | |
| 2009/0037400 A1 * | 2/2009 | Cragun et al. | 707/5 |
| 2009/0276435 A1 | 11/2009 | Whitten et al. | |

FOREIGN PATENT DOCUMENTS

| | | |
|---|---|---|
| JP | 09-214935 A | 8/1997 |
| JP | 2002-197294 A | 7/2002 |
| JP | 2003-032652 A | 1/2003 |
| JP | 2003-132087 A | 5/2003 |

OTHER PUBLICATIONS amazon.com, Inc., "Search Inside the Book: FAQ", 2004, 3 pages [online] [Retrieved on Jan. 4, 2005] Retrieved from the Internet <URL: http://www.amazon.com/execlobidos/tglprowse/-/10197041/QidO/03D11 03344905/sr%3D1-/002-9086708-9426431>.

amazon.com, Inc., "Search Inside the Book: How It Works", 2004, 3 pages [online] [Retrieved on Jan. 4, 2005] Retrieved from the Internet <URL: http://www.amazon.com/execlobidos/tg/browse/-/10197021/002-9086708-9426431>.

Bertino, E., et al., "Author-X: A Java-Based System for XML Data Protection", Data and Application Security, Springer, Boston, MA, © 2002, pp. 15-26.

Bertino, E., et al., "Controlled Access and Dissemination of XML Documents", WIDM 99, Kansas City, MO, © 1999, pp. 22-27.

Bertino, E., et al., "Secure and Selective Dissemination of XML Documents", ACM Transactions on Information and System Security, vol. 5, No. 3, Aug. 2002, pp. 290-331.

Bertino, E., et al., "Securing XML Documents with Author-X", IEEE Internet Computing, May/Jun. 2001, pp. 21-31, vol. 5, Issue 3.

Bertino, E., et al., "Specifying and Enforcing Access Control Policies for XML Document Sources", World Wide Web, vol. 3, No. 3, Springer, Netherlands, Nov. 2000, pp. 139-151.

Brewer, D.F.C., et al., "The Chinese Wall Security Policy," IEEE Symposium on Research in Security and Privacy, May 1989, pp. 206-214.

Broder, A., "A Taxonomy of Web Search", SIGIR Forum, Fall 2002, pp. 3-10, vol. 36, No. 2.

Cohen, J., "A General Overview of Two New Technologies for Playing Protected Content on Portable or Networked Devices", Microsoft Corporation, Jun. 2004, pp. i-iii and 1-8.

Damiani, E., et al., "A fine-grained access control system for XML documents", May 2002, pp. 169-202, vol. 5 Issue 2, ACM Press.

De Bra, P., "Design Issues in Adaptive Hypermedia Application Development", Proc. of the 2nd Workshop on Adaptive Systems and User Modeling on the World Wide Web, TUE Computing Science Report 99-07, 1999, pp. 1-15.

Fu, X., et al., "Mining Navigation History for Recommendation", IUI 2000, pp. 106-112, New Orleans, LA.

Hausheer, D., et al., "Design of a Distributed P2P-based Content Management Middleware", EUROMICRO '03, IEEE Computer Society, Sep. 1-6, 2003, pp. 173-180.

Haveliwala, T., "Topic-Sensitive PageRank: A Context-Sensitive Ranking Algorithm for Web Search", IEEE Transactions on Knowledge and Data Engineering, Jul./Aug. 2003, pp. 784-796, vol. 15, No. 4.

Kiyomitsu, H., et al., "Web Reconfiguration by Spatio-Temporal Page Personalization Rules Based on Access Histories", SAINT 2001, Jan. 8-12, 2001, pp. 75-82, San Diego, CA.

Laine-Cruzel, S., et al., "Improving Information Retrieval by Combining User Profile and Document Segmentation", Information Processing and Management, vol. 32, No. 3, © 1996, pp. 305-315.

Lieberman, H., "Letizia: An Agent That Assists Web Browsing", AAAI Technical Report FS-95-03, 1995, pp. 97-102.

Miklau, G., et al., "Controlling Access to Published Data Using Cryptography", Proc. of the 29th VLDB Conf., Berlin, Germany, 2003, pp. 898-909.

Rabinovich, M., et al., "A Dynamic Object Replication and Migration Protocol for an Internet Hosting Service", ICDCS, May 31-Jun. 4, 1999, pp. 101-113.

Simon, J., et al., "A Digital Licensing Model for the Exchange of Learning Objects in a Federated Environment", WEC 2004, IEEE Computer Society, Jul. 6, 2004, pp. 46-53.

Yu, T., et al., "Compressed Accessibility Map: Efficient Access Control for XML", Proc. of the 28th VLDB Conf., Hong Kong, China, 2002, pp. 478-489.

Australian Office Action, Australian Patent Application No. 2005291883, Apr. 20, 2010, 3 Pages.

Canadian Office Action, Canadian Application No. 2,582,100, May 16, 2012, 3 pages.

Chinese Office Action, Chinese Application No. 200580036543.8, Jun. 13, 2012, 9 pages.

Chinese Office Action, Chinese Patent Application No. 200580036543.8, Mar. 18, 2010, 8 pages.

Chinese Office Action, Chinese Patent Application No. 200580036543.8, Nov. 21, 2008, 5 pages.

Chinese Office Action, Chinese Patent Application No. 2005800365438, Jun. 6, 2008, 23 pages.

European Office Action, European Patent Application No. 05803667.4, Jan. 15, 2010, 3 pages.

European Office Action, European Patent Application No. 05803667.4, Aug. 31, 2007, 4 pages.

Indian Office Action, India Patent Application No. 640/MUMNP/2007, Nov. 24, 2008, 6 pages.

Japanese Office Action, Japanese Patent Application No. JP P2007-534819, Apr. 26, 2011, 6 Pages.

Korean Office Action, Korean Patent Application No. KR 10-2007-7009858, Nov. 23, 2011, 5 pages.

Korean Office Action, Korean Patent Application No. KR 10-2007-7009858, Mar. 23, 2011, 5 Pages.

Notification of Transmittal of the International Search Report and Written Opinion, PCT/US2005/035289, Mar. 7, 2006, 8 pages.

Reexamination Decision for Chinese Patent Application No. 200580036543.8, May 28, 2013, 23 Pages.

* cited by examiner

VARIABLY CONTROLLING ACCESS TO CONTENT

CROSS-REFERENCE TO RELATED APPLICATIONS

This application is a continuation of U.S. patent application Ser. No. 12/501,735, filed on Jul. 13, 2009, entitled "Variably Controlling Access To Content," which is a continuation of U.S. patent application Ser. No. 10/956,564, filed on Oct. 1, 2004, entitled "Variably Controlling Access To Content," now issued as U.S. Pat. No. 7,603,355, both of which are incorporated herein by reference in their entirety. This application is related to the following applications, which are hereby incorporated by reference in their entirety: U.S. patent application Ser. No. 10/948,734, entitled "Image Distortion for Content Security," which was filed on Sep. 22, 2004 (U.S. Pat. No. 7,561,755); and U.S. patent application Ser. No. 10/953,496, entitled "Variable User Interface Based on Document Access Privileges," which was filed on Sep. 30, 2004 (U.S. Pat. No. 7,664,751).

BACKGROUND OF THE INVENTION

1. Field of the Invention

The present invention relates to document security and, more particularly, to preventing a user from obtaining a copy of an entire document.

2. Description of the Background Art

It is easier to make a copy of information in electronic form than it is to make a copy of information in physical form. This fact makes content owners wary of making their electronic information accessible by the public. However, content owners desire to provide their content to users, often for a fee, and would benefit by having this information be searchable, in order to assist users in finding content that matches their interests and needs. Users of search engines in particular expect to be able to view the relevant portions of a document or other content prior to purchasing the content. However, providing users access to the relevant portions typically results in giving users access to the entire document in a way that allows the user to make a copy of all of the content without paying for it.

Alternatively, it is possible to prohibit users' access to the relevant portions of a document until payment is received. However, in that situation, users are unable to see the relevant portions of the document and thus cannot best judge whether the document satisfies their interests or needs and, as a result, are less likely to purchase the content.

Various other technologies have been developed with the goal of allowing a user to view a document while preventing the user from making a copy of it. One possibility is to allow a user to view only a portion of the document. If the user is allowed to choose which portion, however, a team of users can obtain an entire document by coordinating efforts and requesting different portions. Another possibility is to monitor accesses to the document and try to detect attacks. Unfortunately, dynamically and rapidly monitoring data accesses is very difficult to implement.

Other technologies developed to allow a user to view a document while preventing him from making a copy of it include, for example, modifying the user's browser to disable printing and specifying that an image, if printed, should be blank. While many technologies exist, each of them can be circumvented.

What is needed is a way to allow a user to view an electronic document while preventing the user from making a copy of the entire document.

SUMMARY OF THE INVENTION

A method for determining whether to present a portion of a document is presented. The method includes not presenting the portion, responsive to determining that the portion has been designated as inaccessible and presenting the portion, responsive to determining that the portion has been designated as absolutely accessible. The method further includes, responsive to determining that the portion has been designated as variably accessible: evaluating a rule associated with the portion; presenting the portion, responsive to determining that the rule has been satisfied; and not presenting the portion, responsive to determining that the rule has not been satisfied.

Figure 1:
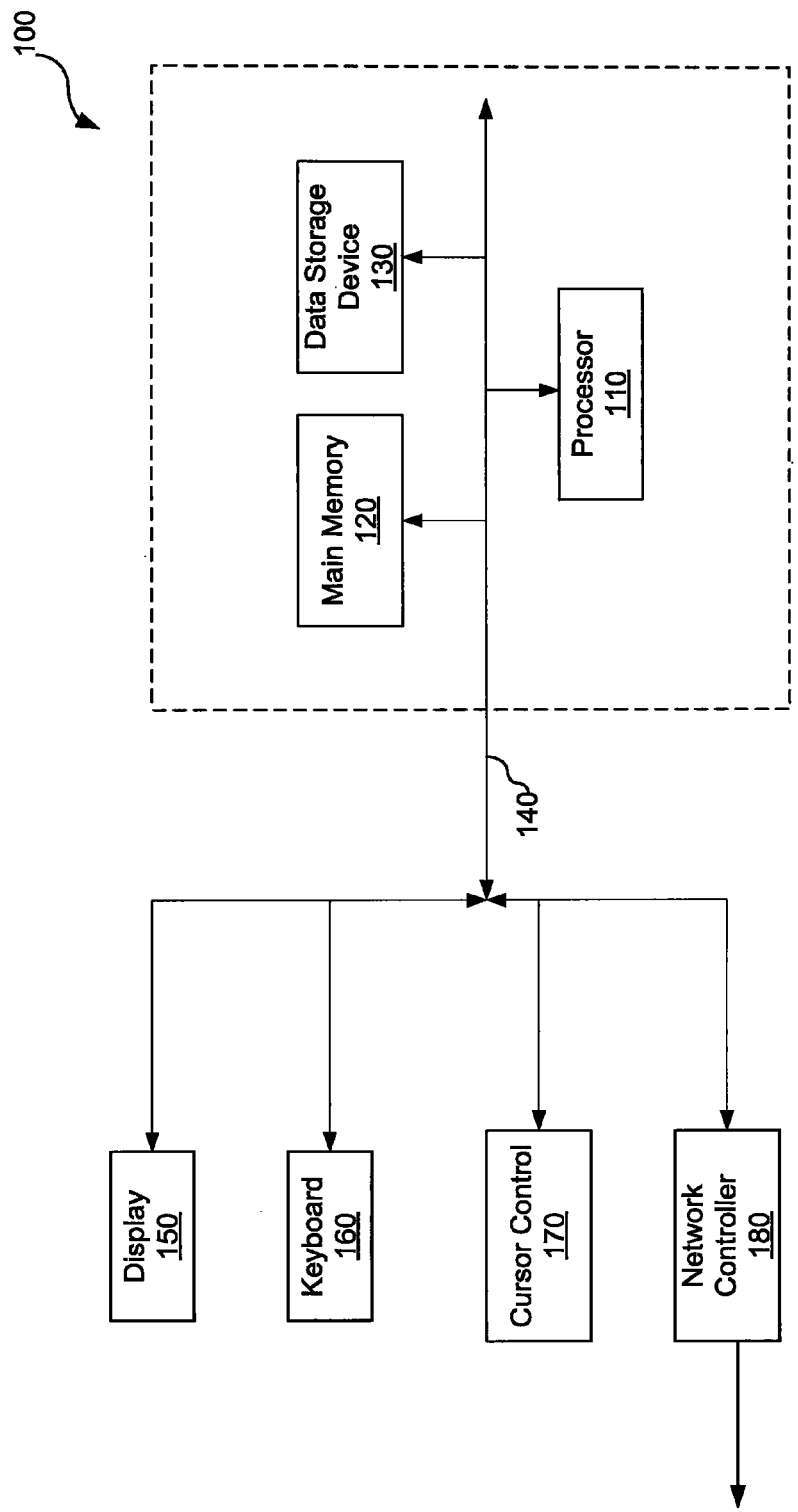
FIG. 1 illustrates a block diagram of a general-purpose computing device for implementing the invention, according to one embodiment of the invention.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

In this disclosure, a "document" is to be broadly interpreted to include any machine-readable and machine-storable work product. A document can be a file, a combination of files, one or more files with embedded links to other files, etc. The files may be of any type, such as text, audio, image, video, etc. Parts of a document to be rendered to an end user can be thought of as "content" of the document. A document can include "structured data" containing both content (words, pictures, etc.) and some indication of the meaning of that content (for example, email fields and associated data, HTML tags and associated data, etc.).

In the context of the Internet, a common document is a Web page. Web pages often include content and may include embedded information (such as meta information, hyperlinks, etc.) and/or embedded instructions (such as JavaScript, etc.). In many cases, a document has a unique, addressable storage location and can therefore be uniquely identified by this addressable location. A universal resource locator (URL) is a unique address used to access information on the Internet.

In one embodiment of the invention, a document is divided into multiple portions. For example, a "unitary" document, such as a 10-minute sound clip, is divided into five portions of two minutes each. Similarly, a "composite" document, which comprises multiple sub-documents, is divided into portions of one or more sub-documents. For example, a document representing a book can be a set of images, each image being one page of the book. This book document can then be divided into portions, with a portion comprising one or more images.

A portion, whether it comes from a unitary document or a composite document, is designated as inaccessible, absolutely accessible, or variably accessible. A portion's designation programmatically controls whether the portion is authorized to be presented to a user. When a user requests a document or a portion thereof, portions designated as inaccessible are not authorized to be presented, while portions designated as absolutely accessible are authorized to be presented. In one embodiment, a document includes at least one portion that is designated as inaccessible. Since this inaccessible portion will never be presented, it is impossible to make a copy of the entire document, whether a user works alone or whether he coordinates his efforts with other users.

In this embodiment, while a document includes at least one inaccessible portion, the determination of which portion should be so designated does not need to be made before the document is made available to the public. As long as a portion exists that has not yet been accessed, there is still time to designate an inaccessible portion. For example, a document is divided into five portions, two of which are initially designated as absolutely accessible and three of which are initially designated as variably accessible. Over time, users access various portions of the document. At some point, users may have accessed four of the five portions. At this time, the last remaining portion (which has not been accessed) can be designated as inaccessible. This portion might have been initially designated as either absolutely accessible or variably accessible.

Portions designated as variably accessible may or may not be presented. In one embodiment, whether a variably accessible portion is presented is based on characteristics of the user attempting to access it. These characteristics can include, for example, the user's identity (userid, IP address, etc.), whether the user has provided certain pieces of information (email address, credit card number, etc.), and how long the user has been using the system. For example, a variably accessible portion might be presented only when the user who requested it had already logged in. In this way, a portion's accessibility can vary among users. In one embodiment, each portion that has been designated as variably accessible can use a different test to determine whether the portion should be presented to a particular user.

The division of a document into portions can be performed in many ways. In one embodiment, the division is based on portion size. For example, an audio clip document is divided into portions of thirty seconds each. In another embodiment, the division is based on the desired number of portions. For example, a video clip document is divided into ten portions, regardless of how long the clip is. In yet another embodiment, the division is based on content structure. For example, a book document containing chapters is divided into portions of one chapter each.

In one embodiment, a document's division into portions can change over time. The division might be changed based on, for example, observed request and/or access patterns for specific portions of the document, where content that was requested and/or accessed by the same user at close points in time is identified as being related and, as a result, grouped together into a single portion.

In one embodiment, a portion is designated as inaccessible, absolutely accessible, or variably accessible based on characteristics of the portion itself. These characteristics can include, for example, the content of the portion, the size of the portion, whether the portion has been requested, the rate at which the portion has been requested, whether the portion has been accessed, or the rate at which the portion has been accessed. For example, if a document included a story with a surprise ending, the portion of the document that contained the surprise ending could be designated as inaccessible. (The portion could be identified by, for example, the document's author or publisher.) As another example, if a document included a story with a really engaging beginning, the portion of the document that contained the beginning could be designated as absolutely accessible.

In another embodiment, a portion is designated based on characteristics of the document containing the portion. These characteristics can include, for example, the rate at which users are requesting and/or accessing various portions of the document. For example, the variably accessible portion of a document that has been requested and/or accessed the most can be designated as absolutely accessible. This would enhance users' experiences by allowing them to access popular content. Similarly, the access pattern information could be tailored to specific characteristics of the user. For example, the variably accessible portion of a document that has been requested and/or accessed the most by users who have logged in can be designated as absolutely accessible (if the user who requested the portion has logged in) or variably accessible (if the user who requested the portion has not logged in).

In one embodiment, a portion can be designated based on multiple characteristics (e.g., the content of the portion and the size of the portion). These characteristics can indicate the same designation or different designations. For example, the rate at which users are requesting and/or accessing the portion could indicate a designation of variably accessible, while the rate at which users are requesting and/or accessing various portions of the document could indicate a designation of inaccessible.

If each characteristic indicates the same designation, then that designation is used. If the characteristics indicate conflicting designations, then a conservative approach would be to choose the most restrictive designation. For example, an absolutely accessible designation and a variably accessible designation would result in a variably accessible designation. A liberal approach would be to choose the least restrictive designation. For example, an absolutely accessible designation and a variably accessible designation would result in an absolutely accessible designation.

Note that the liberal approach could produce a designation of variably accessible from initial designations of inaccessible and variably accessible. In one embodiment, the liberal approach is modified to determine whether the portion in question is the only portion of the document that has not yet been accessed. In this situation, the portion would be designated as inaccessible.

A portion's designation (including its variable accessibility rule, if any) can be static or dynamic over time. However, designating a formerly inaccessible portion as variably accessible or absolutely accessible could result in a user being able to make a copy of an entire document, either by acting alone or as part of a coordinated effort. Note that if this change were made long after the document was originally made available, a user (or team of users) would have to make a concerted effort, over a long period of time, to obtain the entire document. The chance of this happening may be so small as to constitute an acceptable risk in certain circumstances. If this risk must be avoided, however, it is still possible to modify portion designations from variably accessible to absolutely accessible or vice versa. Another option is to change the user characteristics that determine variable accessibility.

Figure 4:
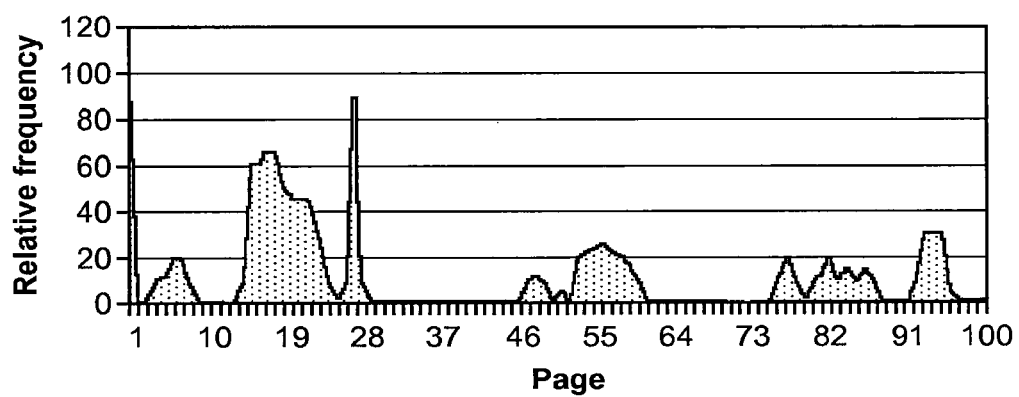
FIG. 4 illustrates a frequency chart that shows, for each portion of a document, the number of times that portion has been requested, according to one embodiment of the invention.

In one embodiment, a portion's designation depends, in part, on past request and/or access patterns associated with that portion. For example, a document repository can track, for a particular document, the number of times that each portion of the document was requested and/or accessed. FIG. 4 illustrates a frequency chart that shows, for each portion of a document, the number of times that portion has been requested, according to one embodiment of the invention.

In one embodiment, the portions that have been requested with the highest frequency in the past are designated as inaccessible for the future, while the portions that have been requested with the lowest frequency in the past are designated as absolutely accessible for the future. The rest of the portions are designated as variably accessible.

In another embodiment, the portions that have been requested with the highest frequency in the past are designated as absolutely accessible for the future, while the portions that have been requested with the lowest frequency in the past are designated as inaccessible for the future. The rest of the portions are designated as variably accessible. Determining designations in this way enhances a user's experience. Most of the time, the portion that a user is interested in will have been designated as absolutely accessible (or variably accessible) and thus is authorized to be presented (or may be authorized to be presented) to the user. It is unlikely that the portion will have been designated as inaccessible. However, since the inaccessible designation always applies to at least one portion, users are prevented from making a copy of the entire document.

In one embodiment, a frequency chart is initially built based on a few user requests.

The initial chart is generally biased towards the first few user requests. If the first few user requests are atypical, the frequency chart may not indicate the portions that would be requested the most by the general public. Over time, as more requests are received, the frequency chart is updated, and the initial bias can be corrected. Eventually, the frequency chart matures and enables popular content and unpopular content to be identified and, as a result, designated as absolutely accessible and inaccessible, respectively.

In one embodiment, a frequency chart is built based on requests from all users. In another embodiment, a frequency chart is built based on requests from only users with certain characteristics. For example, a frequency chart can be "specialized" based on requests from only users who have logged in or only users who have been using the system for a particular amount of time. A specialized frequency chart can be determined based on a user's characteristics and then used to designate portions that that user requests. In this way, users with different characteristics can encounter different designations for the same portion of the same document.

1. Search Context

The document designations described above can be used in a search context. For example, a user enters a search query and receives results comprising a list of links to documents that satisfy the query. In one embodiment, clicking on a link requests an entire document. As the user navigates within the document, each portion of the document is presented or not based on its designation. In another embodiment, clicking on a link requests an excerpt of a document. This excerpt can be, for example, an excerpt of the document that satisfies the query. Whether this excerpt is presented or not is determined by the designations of the one or more portions of the document that contain the excerpt.

In a search context, a frequency chart can be built based on a search index. For example, a search index can indicate which search terms are most frequently used and where these search terms are found within documents. A portion of a document that contains the most frequently used search terms can be designated as absolutely accessible, while a portion of a document that contains the least frequently used search terms can be designated as inaccessible.

In a preferred embodiment, a search engine that enables a user to search a portion of a particular document enables the user to search every portion of the document. Similarly, in a preferred embodiment, every portion of a document that has been designated as absolutely accessible or variably accessible can be searched by a user. Alternatively, certain portions of a document cannot be searched. This embodiment can arise by, for example, not creating a search index for certain portions of a document.

In a preferred embodiment, a document portion that can be searched can also be presented to the user (if the portion has the proper designation). Alternatively, certain portions of a document can be searched but cannot be presented to the user (no matter what the designation of the portion is). This embodiment can arise by creating a search index for certain portions but not actually storing the portions themselves.

2. Apparatus

Embodiments of the invention will now be further described below with reference to FIGS. 1-3. FIG. 1 illustrates a block diagram of a general-purpose computing device for implementing the invention, according to one embodiment of the invention. The computing device 100 preferably includes a processor 110, a main memory 120, a data storage device 130, and a network controller 180, all of which are communicatively coupled to a system bus 140. Computing device 100 may be, for example, a workstation, a desktop computer, a laptop computer, a tablet computer, a personal digital assistant (PDA), or any other type of computing device.

Processor 110 processes data signals and comprises various computing architectures including a complex instruction set computer (CISC) architecture, a reduced instruction set computer (RISC) architecture, or an architecture implementing a combination of instruction sets. Although only a single processor is shown in FIG. 1, multiple processors may be included.

Main memory 120 stores instructions and/or data that are executed by processor 110. The instructions and/or data comprise code for performing any and/or all of the techniques described herein. Main memory 120 is preferably a dynamic random access memory (DRAM) device, a static random access memory (SRAM) device, or some other memory device known in the art.

Data storage device 130 stores data and instructions for processor 110 and comprises one or more devices including a hard disk drive, a floppy disk drive, a CD-ROM device, a DVD-ROM device, a DVD-RAM device, a DVD-RW device, a flash memory device, or some other mass storage device known in the art.

Network controller 180 links the computing device 100 to a network (not shown).

System bus 140 represents a shared bus for communicating information and data throughout the computing device 100. System bus 140 represents one or more buses including an industry standard architecture (ISA) bus, a peripheral component interconnect (PCI) bus, a universal serial bus (USB), or some other bus known in the art to provide similar functionality.

Additional components that may be coupled to the computing device 100 through system bus 140 include a display device 150, a keyboard 160, and a cursor control device 170. Display device 150 represents any device equipped to display electronic images and data to a local user or maintainer. Display device 150 is a cathode ray tube (CRT), a liquid crystal display (LCD), or any other similarly equipped display device, screen, or monitor. Keyboard 160 represents an alphanumeric input device coupled to computing device 100 to communicate information and command selections to processor 110. Cursor control device 170 represents a user input device equipped to communicate positional data as well as command selections to processor 110. Cursor control device 170 includes a mouse, a trackball, a stylus, a pen, cursor direction keys, or other mechanisms to cause movement of a cursor.

It should be apparent to one skilled in the art that computing device 100 includes more or fewer components than those shown in FIG. 1 without departing from the spirit and scope of the present invention. For example, computing device 100 may include additional memory, such as, for example, a first or second level cache or one or more application specific integrated circuits (ASICs). As noted above, computing device 100 may be comprised solely of ASICs. In addition, components may be coupled computing device 100 including, for example, image scanning devices, digital still or video cameras, or other devices that may or may not be equipped to capture and/or download electronic data to/from computing device 100.

Figure 2:
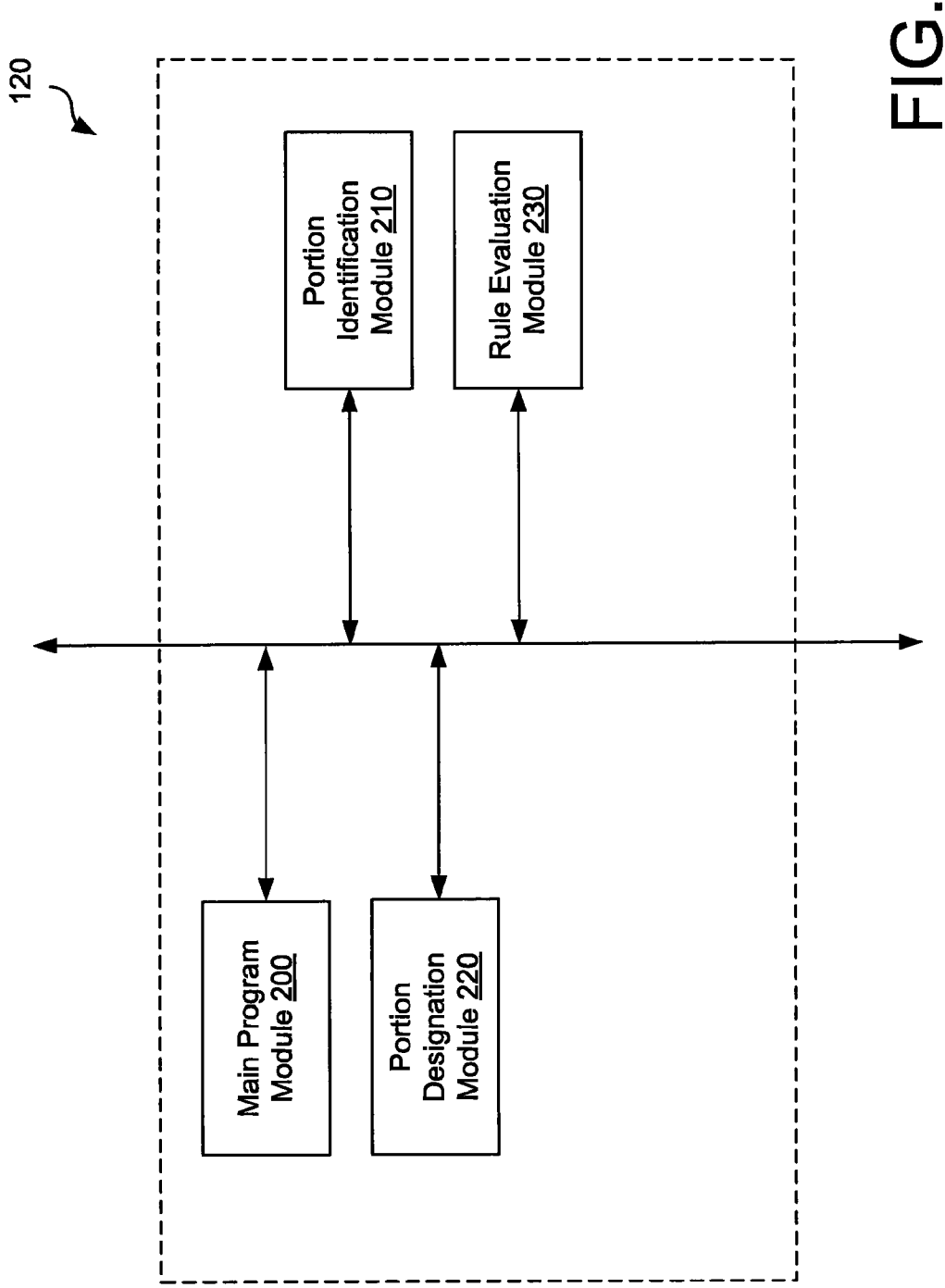
FIG. 2 illustrates a block diagram of a software architecture for a system that implements the invention, according to one embodiment of the invention.

FIG. 2 illustrates a block diagram of a software architecture for a system that implements the invention, according to one embodiment of the invention. Generally, several code modules and memory storage areas are stored in the memory 120 for determining whether a search excerpt (e.g., an excerpt of a document that satisfies a search query) should be presented to a user. Specifically, the code modules and memory storage areas include a main program module 200, a portion identification module 210, a portion designation module 220, and a rule evaluation module 230. Code modules and memory storage areas 200, 210, 220, and 230 are communicatively coupled to each other.

Main program module 200 transmits instructions and data to as well as receives data from each code module and memory.

Portion identification module 210 determines, for a given search excerpt, the one or more portions of a document that contain that excerpt. In one embodiment, portion identification module 210 comprises a memory area that stores information about portions that comprise a document. This memory area can be a table that maps a document to a list of portions comprising the document. The document can be identified using a unique identifier. A portion listed can be a range of the document. For example, if the document is a set of images, a range can be the first ten images. If the document is a sound clip, a range can be the first ten seconds.

In one embodiment, portion identification module 210 receives information comprising the identity of the document that contains the search excerpt. Portion identification module 210 determines a list of portions comprising the document by using the table described above.

Portion identification module 210 then determines which portion (or portions) contains the search excerpt. In one embodiment, portion identification module 210 receives information comprising the context of the search excerpt within the document. For example, if the document is a set of images, the context can be index numbers of images that contain the search excerpt. If the document is a sound clip, the context can be timestamps of the beginning and end of a sound clip that contains the search excerpt. Portion identification module 210 can then use the context to determine which portion (or portions) contains the search excerpt. Alternatively, portion identification module 210 can determine the context itself by accessing the content of the search excerpt, accessing the identified document, and then searching for the search excerpt content within the document.

Portion designation module 220 determines, for a given portion, the designation of that portion. In one embodiment, portion designation module 220 comprises a memory area that stores a designation for a portion of a document. This memory area can be a table that maps a portion of a document to that portion's designation. This designation may be, e.g., inaccessible, absolutely accessible, or variably accessible. If the designation is variably accessible, portion designation module 220 also stores a rule that, when applied, determines whether the portion in question should be presented to the particular user that requested it. In a preferred embodiment, all portions of all documents have a designation.

In one embodiment, portion designation module 220 receives information comprising the identity of a portion of a document. Portion designation module 220 determines the designation of this portion (and its associated rule, if the designation is variably accessible) by using the table described above.

Rule evaluation module 230 determines, for a given rule and a given user, whether the user's characteristics satisfy the variable accessibility rule. As discussed above, a variable accessibility rule can be based on, for example, one or more characteristics of the user. These characteristics can be, e.g., the user's identity (userid, IP address, etc.), whether the user has provided certain pieces of information (email address, credit card number, etc.), and how long the user has been using the system.

In one embodiment, rule evaluation module 230 accesses information comprising a variable accessibility rule. This rule can be returned by portion designation module 220. If a variable accessibility rule uses information regarding a user's characteristics, rule evaluation module 230 accesses characteristics of the user in question. These characteristics can be stored by a "cookie" file on the user's machine. Alternatively, if the user has identified herself (e.g., by logging in), this information can be associated with the user and stored in main memory 120. Rule evaluation module 230 then applies the rule to the user's characteristics to determine whether the rule is satisfied.

3. User Scenario

Figure 3:
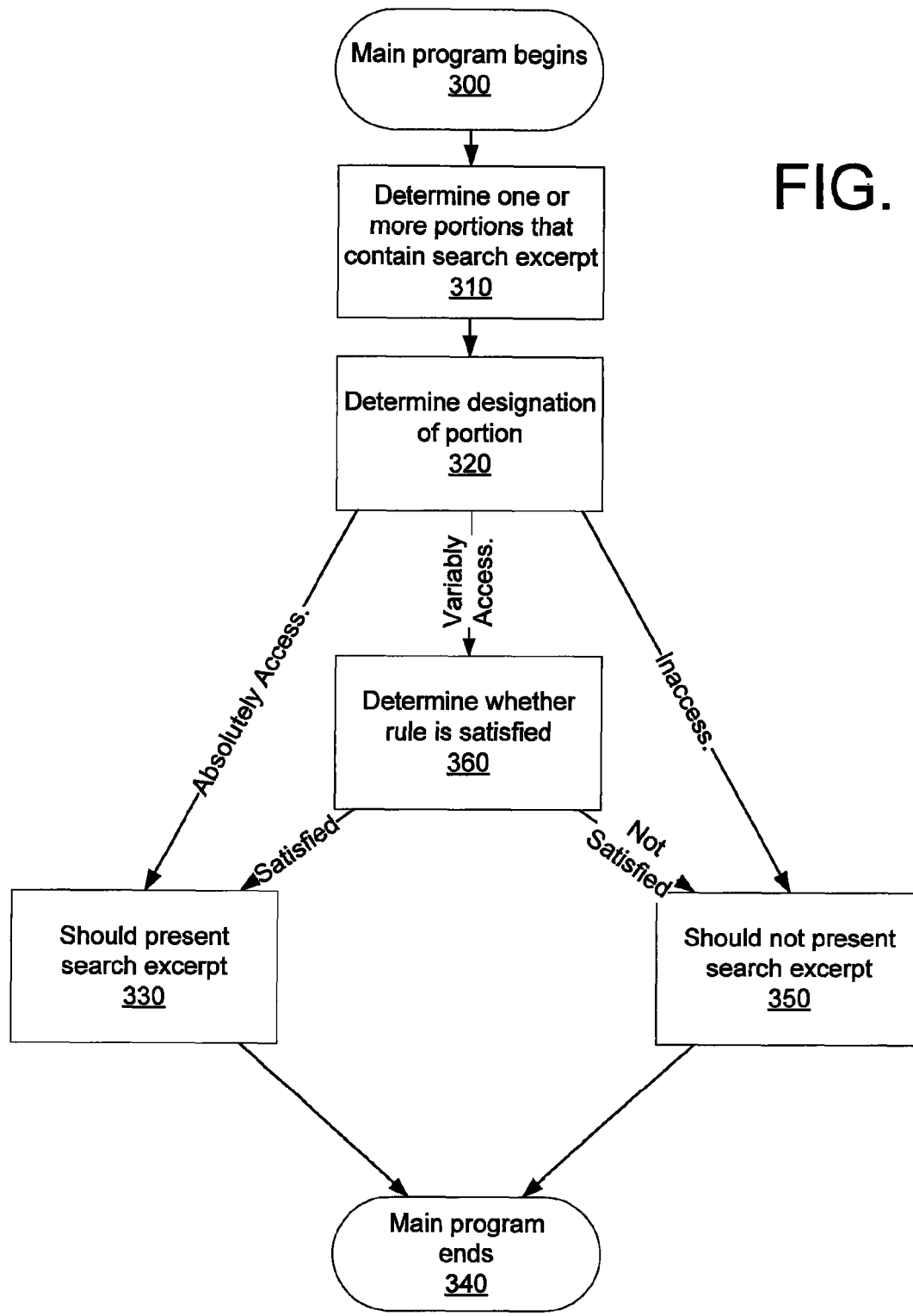
FIG. 3 illustrates a flowchart of a method performed by a main program, according to one embodiment of the invention.

FIG. 3 illustrates a flowchart of a method performed by a main program, according to one embodiment of the invention. This method may be used, for example, in conjunction with a search engine. Before the method of FIG. 3 begins, a user enters a query into a search engine. The query may contain various search terms and expressions.

The search engine then generates a set of results. Each result represents a reference to a document that "matches" the query. The particular way in which the search engine determines matching documents is not material to the invention, which may be used with any type of search engine. A document may match a query because, for example, its contents satisfy the query or because meta-information associated with the document (e.g., the document's author or publication date) satisfy the query. The search engine provides a search result set, typically containing a list of matching documents.

When a user selects one of the search results (e.g., by clicking on a link of the document's name), the search engine determines a part of the document that matches the query (a search excerpt). This process is known to those of ordinary skill in the art. Main program module 200 then begins 300.

Main program module 200 uses portion identification module 210 to determine 310 a portion of a document that contains the search excerpt. Main program module 200 then uses portion designation module 220 to determine 320 the designation of that portion.

If the designation is "absolutely accessible," then the main program module 200 indicates 330 that the search excerpt should be presented and then ends 340. If the designation is "inaccessible," then the main program module 200 indicates 350 that the search excerpt should not be presented and then ends 340.

If the designation is "variably accessible," then the main program module 200 uses rule evaluation module 230 to determine 360 whether the rule is satisfied. If the rule is satisfied, then the main program module 200 indicates 330 that the search excerpt should be presented to the user and then ends 340. If the rule is not satisfied, then the main program module 200 indicates 350 that the search excerpt should not be presented to the user and then ends 340.

In one embodiment, if the search excerpt is contained within a plurality of portions (i.e., if the search excerpt spans multiple portions), then step 310 results in multiple portions. Steps 320-360 are then executed (as necessary) for each of these portions, as described above. In one embodiment, if the rule is satisfied for every portion containing the search excerpt, then the search excerpt is presented to the user. In this embodiment, if a rule is not satisfied for any portion containing the search excerpt, then the search excerpt is not presented to the user. In another embodiment, a part of a search excerpt that is contained within a particular portion is presented (or not) based on the designation of that portion.

In one embodiment, if the search excerpt is contained within a portion that does not have a designation, then step 320 results in no designation. In this situation, a customizable default setting determines whether the search excerpt should be presented to the user. Similarly, if a rule cannot be evaluated (e.g., because the necessary user characteristics are not known), then a second customizable default setting can determine whether the search excerpt should be presented to the user.

4. Additional Embodiments

In one embodiment, the designation of a portion is used to indicate how (instead of whether) to present a search excerpt. For example, a search excerpt within an "inaccessible" portion is presented, but not in its "true" format. The search excerpt can be distorted before presenting it to the user. Although, in this embodiment, an entire document can be presented to a user (because even an "inaccessible" search excerpt is presented), the document is still protected because one or more portions of it are not presented in their "true" format. Distorting a document in order to prevent it from being misappropriated is further discussed in co-pending U.S. patent application Ser. No. 10/948,734, entitled "Image Distortion for Content Security," which was filed on Sep. 22, 2004 (U.S. Pat. No. 7,561,755).

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems appears from the description. In addition, the present invention is not described with reference to any particular programming language. It will be appreciated that a variety of programming languages may be used to implement the teachings of the invention as described herein.

One skilled in the art will recognize that the particular examples described herein are merely illustrative of representative embodiments of the invention, and that other arrangements, methods, architectures, and configurations may be implemented without departing from the essential characteristics of the invention. Accordingly, the disclosure of the present invention is intended to be illustrative, but not limiting, of the scope of the invention, which is set forth in the following claims.

What is claimed is:

1. A system for providing controlled access to a portion of a document, the system comprising:
   a non-transitory computer readable storage medium storing computer program modules executable to perform steps comprising:
      sending a request from a user to access a requested portion of a plurality of portions of the document to a server, wherein the server is adapted to:
         access usage data describing how many times a plurality of users have accessed the plurality of portions of the document, wherein the usage data indicates that at least one portion of the plurality of portions has not been accessed by any of the plurality of users; and
         determine, based on the usage data, whether to provide access to the requested document portion to the user; and
      receiving a response from the server indicating whether the server determined to provide access to the requested document portion to the user; and
   a computer processor for executing the computer program modules.

2. The system of claim 1, wherein the server determines to deny access to the requested document portion responsive to the usage data indicating that access was provided to all document portions other than the requested document portion.

3. The system of claim 1, wherein the server determines to grant access to the requested document portion responsive to the usage data indicating that access was not provided to one or more document portions other than the requested document portion.

4. The system of claim 1, wherein the steps further comprise, responsive to the server determining not to provide access to the requested document portion:
   receiving a response from the server containing a version of the requested document portion having a modified visual appearance.

5. The system of claim 4, wherein the modified visual appearance comprises a distortion of the requested document portion.

6. The system of claim 1, wherein the steps further comprise:
   sending a search query to the server, wherein the server identifies the document responsive to the search query.

7. The system of claim 6, wherein the requested document portion is a portion of the document that matches the search query.

8. A non-transitory computer readable storage medium storing computer program modules for providing controlled access to a portion of a document, the computer program modules executable to perform steps comprising:
   receiving a request from a user to access a requested portion of a plurality of portions of the document
   accessing usage data that describes how many times a plurality of users have accessed the plurality of portions of the document, wherein the usage data indicates that at least one portion of the plurality of portions has not been accessed by any of the plurality of users; and
   determining, based on the usage data, whether to provide access to the requested document portion to the user.

9. The computer readable storage medium of claim 8, wherein the steps further comprise:
   modifying a visual appearance of the requested document portion responsive to determining not to provide access to the requested document portion; and
   providing to the user the modified requested document portion.

10. The computer readable storage medium of claim 8, wherein the server determines to deny access to the requested document portion responsive to the usage data indicating that access was provided to all document portions other than the requested document portion.

11. The computer readable storage medium of claim 8, wherein the server determines to grant access to the requested document portion responsive to the usage data indicating that access was not provided to one or more document portions other than the requested document portion.

12. The computer readable storage medium of claim 8, wherein the steps further comprise:
   receiving a search query from the user; and
   identifying the document in response to the search query.

13. The computer readable storage medium of claim 12, wherein the requested document portion is a portion of the document that matches the search query.

14. The computer readable storage medium of claim 8, wherein access to the requested document portion is denied responsive to the usage data indicating that access was provided to all document portions other than the requested document portion.

15. The computer readable storage medium of claim 8, wherein access to the requested document portion is granted responsive to the usage data indicating that access was not provided to one or more document portions other than the requested document portion.

16. A method implemented by a computer comprising at least one processor for providing controlled access to a portion of a document, the method comprising:
   receiving a request from a user to access a requested portion of a plurality of portions of the document;
   accessing usage data that describes how many times a plurality of users have accessed the plurality of portions of the document, wherein the usage data indicates that at least one portion of the plurality of the portions has not been accessed by any of the plurality of users; and
   determining, based on the usage data, whether to provide access to the requested document portion to the user.

17. The method of claim 16, further comprising:
   modifying a visual appearance of the requested document portion responsive to determining not to provide access to the requested document portion; and
   providing to the user the modified requested document portion.

18. The method of claim 16, further comprising:
   receiving a search query from the user; and
   identifying the document in response to the search query.

19. The method of claim 16, wherein access to the requested document portion is denied responsive to the usage data indicating that access was provided to all document portions other than the requested document portion.

20. The method of claim 16, wherein access to the requested document portion is granted responsive to the usage data indicating that access was not provided to one or more document portions other than the requested document portion.

* * * * *